US011962995B2

(12) United States Patent
Xie et al.

(10) Patent No.: US 11,962,995 B2
(45) Date of Patent: Apr. 16, 2024

(54) VIRTUAL PLAYBACK METHOD FOR SURROUND-SOUND IN MULTI-CHANNEL THREE-DIMENSIONAL SPACE

(71) Applicants: SOUTH CHINA UNIVERSITY OF TECHNOLOGY, Guangdong (CN); GUANGZHOU UNIVERSITY, Guangdong (CN)

(72) Inventors: Bosun Xie, Guangdong (CN); Chengyun Zhang, Guangdong (CN); Lulu Liu, Guangdong (CN)

(73) Assignees: SOUTH CHINA UNIVERSITY OF TECHNOLOGY, Guangzhou (CN); GUANGZHOU UNIVERSITY, Guangdong (CN)

( * ) Notice: Subject to any disclaimer, the term of this patent is extended or adjusted under 35 U.S.C. 154(b) by 366 days.

(21) Appl. No.: 17/290,778

(22) PCT Filed: Dec. 14, 2018

(86) PCT No.: PCT/CN2018/120990
§ 371 (c)(1),
(2) Date: May 3, 2021

(87) PCT Pub. No.: WO2020/087678
PCT Pub. Date: May 7, 2020

(65) Prior Publication Data
US 2021/0377688 A1 Dec. 2, 2021

(30) Foreign Application Priority Data
Nov. 1, 2018 (CN) ......................... 201811297263.8

(51) Int. Cl.
*H04S 7/00* (2006.01)
*H04R 3/12* (2006.01)
(Continued)

(52) U.S. Cl.
CPC ............... *H04S 7/303* (2013.01); *H04R 3/12* (2013.01); *H04R 5/02* (2013.01); *H04S 2400/11* (2013.01); *H04S 2420/01* (2013.01)

(58) Field of Classification Search
CPC .. H04S 7/303; H04S 2400/11; H04S 2420/01; H04R 3/12; H04R 5/02
(Continued)

(56) References Cited

U.S. PATENT DOCUMENTS

| | | | | |
|---|---|---|---|---|
| 6,795,556 | B1 * | 9/2004 | Sibbald | H04S 1/002 381/310 |
| 2017/0064484 | A1 * | 3/2017 | Borss | H04S 5/005 |
| 2018/0192226 | A1 * | 7/2018 | Woelfl | H04R 5/033 |

FOREIGN PATENT DOCUMENTS

| | | |
|---|---|---|
| CN | 1440217 | 9/2003 |
| CN | 1219415 | 9/2005 |

(Continued)

*Primary Examiner* — Vivian C Chin
*Assistant Examiner* — Douglas J Suthers
(74) *Attorney, Agent, or Firm* — JCIPRNET

(57) ABSTRACT

Disclosed in the invention is a virtual reproduction method for a multichannel spatial surround sound in three-dimensional space. Multichannel spatial surround sound signals are undergone a sum and difference operation and processed with virtual reproduction signal processing functions, then fed to four actual loudspeakers arranged at left-front-up and right-front-up directions on a high elevation plane of 30°±10° and horizontal left-front and right-front directions for reproduction, and generate a auditory effect of spatial surround sound. The invention simplifies the number and arrangement of loudspeakers required for multichannel spatial surround sound reproduction, and is suitable for cases in which the arrangement of multiple loudspeakers for spatial surround sound is infeasible, such as in a TV set, and so on.

5 Claims, 5 Drawing Sheets

(51) Int. Cl.
*H04R 5/02* (2006.01)
*H04S 5/02* (2006.01)

(58) Field of Classification Search
USPC .......................................................... 381/303
See application file for complete search history.

(56) References Cited

FOREIGN PATENT DOCUMENTS

| | | | |
|---|---|---|---|
| CN | 1953620 | 4/2014 | |
| CN | 104284291 | 1/2015 | |
| CN | 105072557 | 11/2015 | |
| CN | 107105384 | 8/2017 | |
| CN | 107347173 | 11/2017 | |
| CN | 206908863 | 1/2018 | |
| WO | 2006052188 | 5/2006 | |
| WO | WO2006052188 A1 * | 5/2006 | ............... H04S 3/02 |

* cited by examiner

VIRTUAL PLAYBACK METHOD FOR SURROUND-SOUND IN MULTI-CHANNEL THREE-DIMENSIONAL SPACE

CROSS-REFERENCE TO RELATED APPLICATION

This application is a 371 of international application of PCT application serial no. PCT/CN2018/120990, filed on Dec. 14, 2018, which claims the priority benefit of China application no. 201811297263.8, filed on Nov. 1, 2018. The entirety of each of the above mentioned patent applications is hereby incorporated by reference herein and made a part of this specification.

TECHNICAL FIELD

The present invention relates to the field of electroacoustic technologies, and more particularly, refers to a method of virtual reproduction for multichannel spatial surround sound in three-dimensional space.

BACKGROUND

At present, a multichannel surround sound technology has been evolving from traditional horizontal surround sound to spatial surround sound, and has been applied to movies, domestic audio and video reproduction, and other fields. Loudspeakers are arranged on a horizontal plane for the traditional horizontal surround sound. For example, the domestic 5.1-channel surround sound recommended by the International Telecommunication Union involves five loudspeakers with full audible bandwidth, including left L, centre C, and right R loudspeakers in front of the horizontal plane, as well as left-surround LS and right-surround RS loudspeakers on a side back of the horizontal plane, and an optional subwoofer. Compared with the horizontal surround sound, a spatial surround sound greatly improves the spatial perceptual performance, but is more complex and requires more loudspeakers in reproduction, and usually utilizes layer-wise loudspeaker configurations. For example, the 9.1 channel spatial surround sound consists of a horizontal-layer and an upper (high)-layer loudspeaker configuration (i.e., nine loudspeakers with full audible bandwidth), as well as an optional subwoofer. The arrangement of five loudspeakers with full audible bandwidth in the horizontal layer is identical to that of 5.1-channel surround sound recommended by the International Telecommunication Union. And the four loudspeakers with full audible bandwidth in the upper layer are arranged above the left-front, right-front, left-surround and right-surround loudspeakers in the horizontal plane, respectively.

On the other hand, in some practical uses such as TV set, it is inconvenient to arrange multiple loudspeakers for multichannel spatial surround sound reproduction due to the limitation of a room condition. Therefore, virtual reproduction method has been used the number of loudspeakers. The principle of virtual reproduction is first processing the multichannel surround sound signals with head related transfer functions (HRTFs) and the mixing to less channel signals, and finally reproducing with fewer actual loudspeakers, so as to achieve an effect similar to that of multichannel surround sound and reach the aim of simplifying multichannel surround sound.

For the reproduction of the 5.1-channel horizontal surround sound, foreign countries have developed patented technologies and products (such as SRS, Qsurround, Dolby, etc.) of virtual reproduction with two front loudspeakers, but there are some general defects, especially a narrow listening area and a change in timbre. In the national granted invention patent (patent number: CN1219415C), the problems of the narrow listening area and the change in timbre in the past technology are overcome, and a head related transfer function filters are also simplified. The two patented technologies can be used in the reproduction of the horizontal surround sound in the TV set, and implemented by a pair of left and right loudspeakers arranged on two sides of the TV set, or a bar-shaped loudspeaker system integrating left and right channels. (called "Sound Bar") that is arranged above (or below) the TV set.

The technology of virtual reproduction for spatial surround sound with two front loudspeakers has been developed internationally. Although a structure of this kind of technology is simple, due to the limitation of a physical principle of the virtual reproduction with two actual loudspeakers, this kind of technology is only able to recreate virtual spatial sound effect in the front-horizontal quadrants, but cannot generate a stable spatial surround sound effect in a vertical direction.

SUMMARY

The present invention further provides a method of virtual reproduction for multichannel spatial surround sound in three-dimensional space. In the method, spatial sound signals are converted into four-channel signals by processing with HRTF (Head Related Transfer Function), and reproduced by four actual loudspeakers arranged in the directions of left-front, right-front, left-front-up and right-front-up. In practical application, this four-loudspeaker arrangement can be implemented by a pair of bar-shaped loudspeaker systems arranged above and below a TV set respectively, or a pair of bar-shaped loudspeaker systems vertically arranged on left and right sides of the TV set respectively, or a pair of loudspeakers arranged on the left and right sides of the TV set respectively and one bar-shaped loudspeaker system arranged above the TV set.

The method of virtual reproduction for multichannel spatial surround sound in three-dimensional space according to the present invention includes the following steps:

step 1: arranging four loudspeakers at directions of left-front, right-front in a horizontal plane and at directions of left-front-up, right-front-up on an elevation plane of 30°±15° respectively;

step 2: inputting M (even number) non-front and non-back channel signals $E_1$, $E_2$, . . . $E_M$ of an original spatial surround sound in a horizontal layer, and a front channel signal $E_{M+1}$ and a back channel signal $E_{M+2}$ if the front channel signal $E_{M+1}$ and the back channel signal $E_{M+2}$ exist, and numbering M channel signals according to a rule that an odd number represents a left half-space channel and an even number represents a symmetric right half-space channel, wherein m=1, 2, . . . M;

step 3: inputting M' (even number) non-front and non-back channel signals $E'_1$, $E'_2$, $E'_{M'}$ of an original spatial surround sound in an upper layer, and a front channel signal $E'_{M'+1}$ and a back channel signal $E'_{M'+2}$ if the front channel signal $E'_{M'+1}$ and the back channel signal $E'_{M'+2}$ exist, and numbering M' channel signals according to a rule that an odd number represents a left half-space channel and an even number represents a symmetric right half-space channel, wherein m'=1, 2, . . . M';

- step 4: for the M channel signals of the horizontal layer, carrying out an add and subtract (sum and difference) operation on each left half-space channel signal and each symmetric right half-space channel signal to obtain M/2 sum signals $(E_1+E_2)$, $(E_3+E_4)$, . . . $(E_{M-1}+E_M)$ of the horizontal layer and M/2 difference signals $(E_1-E_2)$, $(E_3-E_4)$, . . . $(E_{M-1}-E_M)$ of the horizontal layer;
- step 5: for the M' channel signals of the upper layer, carrying out an add and subtract (sum and difference) operation on each left half-space channel signal and each symmetric right half-space channel signal to obtain M'/2 sum signals $(E'_1+E'_2)$, $(E'_3+E'_4)$, . . . $(E'_{M'-1}+E'_{M'+1})$ of the upper layer and M'/2 difference signals $(E'_1-E'_2)$, $(E'_3-E'_4)$, . . . $(E'_{M'-1}-E'_{M'})$ of the upper layer;
- step 6: filtering the M/2 sum signals of the horizontal layer with M/2 signal processing functions $\Sigma_{1,2}$, $\Sigma_{3,4}$, . . . $\Sigma_{M-1,M}$ respectively and summing the signals, and then adding the front and back channel signals $E_{M+1}$ and $E_{M+2}$ if the front and back channel signals $E_{M+1}$ and $E_{M+2}$ exist to obtain a total sum signal $E_{SUM}=\Sigma_{1,2}(E_1+E_2)+\Sigma_{3,4}(E_3+E_4)$, . . . $+\Sigma_{M-1,M}(E_M+E_{M+1})+E_{M+1}+E_{M+2}$ of the horizontal layer;
- step 7: filtering the M/2 difference signals of the horizontal layer with M/2 virtual reproduction signal processing functions $\Delta_{1,2}$, $\Delta_{3,4}$ . . . $\Delta_{M-1,M}$ respectively and then summing the signals to obtain a total difference signal $E_{DIF}=\Delta_{1,2}(E_1-E_2)+\Delta_{3,4}(E_3-E_4)$, . . . $+\Delta_{M-1,M}(E_{M-1}-E_M)$ of the horizontal layer;
- step 8: filtering the M'/2 sum signals of the upper layer with M'/2 virtual reproduction signal processing functions $\Sigma'_{1,2}$, $\Sigma'_{3,4}$, . . . $E'_{M'-1,M'}$ respectively and summing the signals, and then adding the front and back channel signals $E_{M'+1}$ and $E_{M'+2}$ if front and back channel signals $E_{M'+1}$ and $E_{M'+2}$ exist to obtain a total sum signal $E'_{SUM}=\Sigma'_{1,2}(E'_1+E'_2)+\Sigma'_{3,4}(E'_3+E_4)$, . . . $+\Sigma'_{M'-,M'}(E'_{M'}+E'_{M'+1})+E_{M'+1}+E_{M'+2}$ of the upper layer;
- step 9: filtering the M'/2 difference signals of the upper layer with M'/2 virtual reproduction signal processing functions $\Delta'_{1,2}$, $\Delta'_{3,4}$, . . . $\Delta'_{M-1,M}$ respectively and then summing the signals to obtain a total difference signal $E'_{DIF}=\Delta'_{1,2}(E'_1-E'_2)+\Delta'_{3,4}(E'_3-E'_4)$, . . . $+\Delta'_{M'-1,M'}(E'_{M'}-E'_{M'+1})$ of the upper layer;
- step 10: carrying out a sum and difference operation on the total sum signal $E_{SUM}$ and the total difference signal $E_{DIF}$ of the horizontal layer, attenuating them to respectively obtain reproduced signals for the actual loudspeakers at left-front and right-front directions in the horizontal plane, and feeding the signals to corresponding actual loudspeakers for reproduction; and
- step 11: carrying out a sum and difference operation on the total sum signal $E'_{SUM}$ and the total difference signal $E'_{DIF}$ of the upper layer, attenuating them to respectively obtain reproduction signals of the actual loudspeakers at left-front-up and right-front-up directions, and feeding the signals to corresponding actual loudspeakers for reproduction.

Further, in the step 10, the sum and difference operation is carried out on the total sum signal $E_{SUM}$ and the total difference signal $E_{DIF}$ of the horizontal layer, and the signals are attenuated by −3 dB, which is, multiplied by 0.7 to respectively obtain the reproduced signals $E_{L1}=0.7(E_{SUM}+E_{DIF})$ and $E_{R1}=0.7(E_{SUM}-E_{DIF})$ of the actual loudspeakers at left-front and right-front directions, and the signals are fed to the corresponding actual loudspeakers for reproduction.

Further, in the step 11, the sum and difference operation is carried out on the total sum signal $E'_{SUM}$ and the total difference signal $E'D_{DIF}$ of the upper layer, and the signals are attenuated by −3 dB, which is, multiplied by 0.7 to respectively obtain the reproduced signals $E_{L2}=0.7(E'_{SUM}+E'_{DIF})$ and $E_{R2}=0.7(E'_{SUM}-E'_{DIF})$ of the actual loudspeakers at left-front-up and right-front-up directions, and the signals are fed to the corresponding actual loudspeakers for reproduction.

Further, the filtering with the M/2 virtual reproduction signal processing functions $\Sigma_{1,2}$, $\Sigma_{3,4}$, . . . $\Sigma_{M-1,M}$ in the step 6, and the filtering with the M/2 virtual reproduction signal processing functions $\Delta_{1,2}$, $\Delta_{3,4}$ . . . $\Delta_{M-1,M}$ in step 7 are carried out according to the virtual reproduction signal processing functions obtained by the following equations:

$$\sum_{m,m+1} = 0.707[A_1(\theta_m, \omega) + A_1(\theta_{m+1}, \omega)]$$

$$\Delta_{m,m+1} = 0.707[A_1(\theta_m, \omega) - A_1(\theta_{m+1}, \omega)]$$

$$A_1(\theta_m, f) = \frac{(\alpha_1 H_L(\theta_m, f) - \beta_1 H_R(\theta_m, f))}{\sqrt{|\alpha_1 H_L(\theta_m, f) - \beta_1 H_R(\theta_m, f)|^2 + |-\beta_1 H_L(\theta_m, f) + \alpha_1 H_R(\theta_m, f)|^2}} \frac{|\alpha_1^2 - \beta_1^2|}{\alpha_1^2 - \beta_1^2}$$

Where $H_L(\theta_m, f)$ and $H_R(\theta_m, f)$ are a pair of Head Related Transfer Functions (HRTFs) from virtual loudspeakers in a direction of $\theta_m$ of the horizontal plane to left and right ears, wherein f is a frequency; and $\alpha_1=\alpha_1(f)$ and $\beta_1=\beta_1(f)$ are HRTFs from actual loudspeaker at horizontal left-front or right-front to the ipsilateral and contralateral ears, respectively.

Further, the filtering with the M'/2 signal processing functions $\Sigma'_{1,2}$, $\Sigma'_{3,4}$, . . . $\Sigma'_{M'-1,M'}$ in the step 8, and the filtering with the M'/2 signal processing functions $\Delta'_{1,2}$, $\Delta'_{3,4}$, . . . $\Delta'_{M-1,M'}$ in the step 9 are carried out according to signal processing functions obtained by the following equations:

$$\sum_{m',m'+1}' = 0.707[A_2(\theta'_{m'}, f) + A_2(\theta'_{m'+1}, f)]$$

$$\Delta'_{m',m'+1} = 0.707[A_2(\theta'_{m'}, f) - A_1(\theta'_{m'+1}, f)]$$

$$A_2(\theta'_{m'}, f) = \frac{\alpha_2 H_L(\theta'_{m'}, f) - \beta_2 H_R(\theta'_{m'}, f)}{\sqrt{|\alpha_2 H_L(\theta'_{m'}, f) - \beta_2 H_R(\theta'_{m'}, f)|^2 + |-\beta_2 H_L(\theta'_{m'}, f) + \alpha_2 H_R(\theta'_{m'}, f)|^2}} \frac{|\alpha_2^2 - \beta_2^2|}{\alpha_2^2 - \beta_2^2}$$

Where $H_L(\theta'_{m'}, f)$ and $H_R(\theta'_{m'}, f)$ are a pair of Head Related Transfer Functions (HRTFs) from virtual loudspeakers in a direction of $\theta'_{m'}$ of the horizontal plane to left and right ears; and $\alpha_2=\alpha_2(f)$ and $\beta_2=\beta_2(f)$ are HRTFs from actual loudspeaker at left-front-up (or right-front-up) directions in the ipsilateral and contralateral ears, respectively.

A principle of the present invention is that: according to a basic theory of virtual reproduction, the left-front and right-front actual loudspeakers arranged on a certain elevation plane may generate multiple virtual loudspeakers on front quadrants of the elevation plane. Four actual loudspeakers are used for virtual reproduction, wherein two loudspeakers are respectively arranged at left-front and right-front directions of the horizontal plane, and the other two loudspeakers are respectively arranged at left-front-up and right-front-up directions of the high elevation plane. Virtual reproduction signal processing may generate virtual loudspeakers on a front quadrant of the horizontal layer and the upper layer for multichannel spatial surround sound, thus generating a surround sound effect in three-dimensional space, including an effect in a vertical direction. In practical application, a pair of horizontal bar-shaped loudspeaker systems arranged above and below a TV set respectively, or a pair of vertical bar-shaped loudspeaker systems arranged on left and right sides of the TV set respectively, or a pair of loudspeakers arranged on the left and right sides of the TV set respectively and one horizontal bar-shaped loudspeaker system arranged above the TV set are all equivalent to a combination of a pair of left-front and right-front actual loudspeakers of the horizontal plane and a pair of left-front-up and right-front-up actual loudspeakers of the high elevation plane, so that the present invention may be implemented.

Compared with the prior art, the present invention has the following advantages and beneficial effects.

Independent original signals of the multichannel spatial surround sound are virtually processed, and then reproduced by four actual loudspeakers arranged at the left-front and right-front directions of the horizontal plane and the left-front-up and right-front-up directions of the high elevation plane, compared with the original loudspeakers arrangement of the multichannel spatial surround sound, a hardware structure thereof is simpler, and meanwhile, the spatial surround sound effect may be generated, including the effect in the vertical direction.

The arrangement of the loudspeakers in the present invention is suitable for the TV set and other video reproduction applications.

The present invention is compatible with virtual reproduction of traditional 5.1-channel surround sound by two loudspeakers.

The present invention may be designed as special hardware or general software for sound reproduction in a digital television, a home theater, and the like, and may also be used as hardware or software for sound reproduction in a multimedia computer.

DETAILED DESCRIPTION

The present invention is further described in detail hereinafter with reference to the accompanying drawings and the embodiments, but the implementation and the scope of protection of the present invention are not limited to this.

According to a method of virtual reproduction method for a multichannel spatial surround sound in three-dimensional space in the embodiment, loudspeakers are arranged first, and coordinates are selected as an elevation of $-90°\le\phi\le90°$ and an azimuth of $-180\le\theta\le180$, wherein $\phi=-90°$, 0°, and 90° respectively represent below, a horizontal plane, and above; and on the horizontal plane, $\theta=0°$, 90°, and 180° respectively represent front, left, and back.

Figure 1:
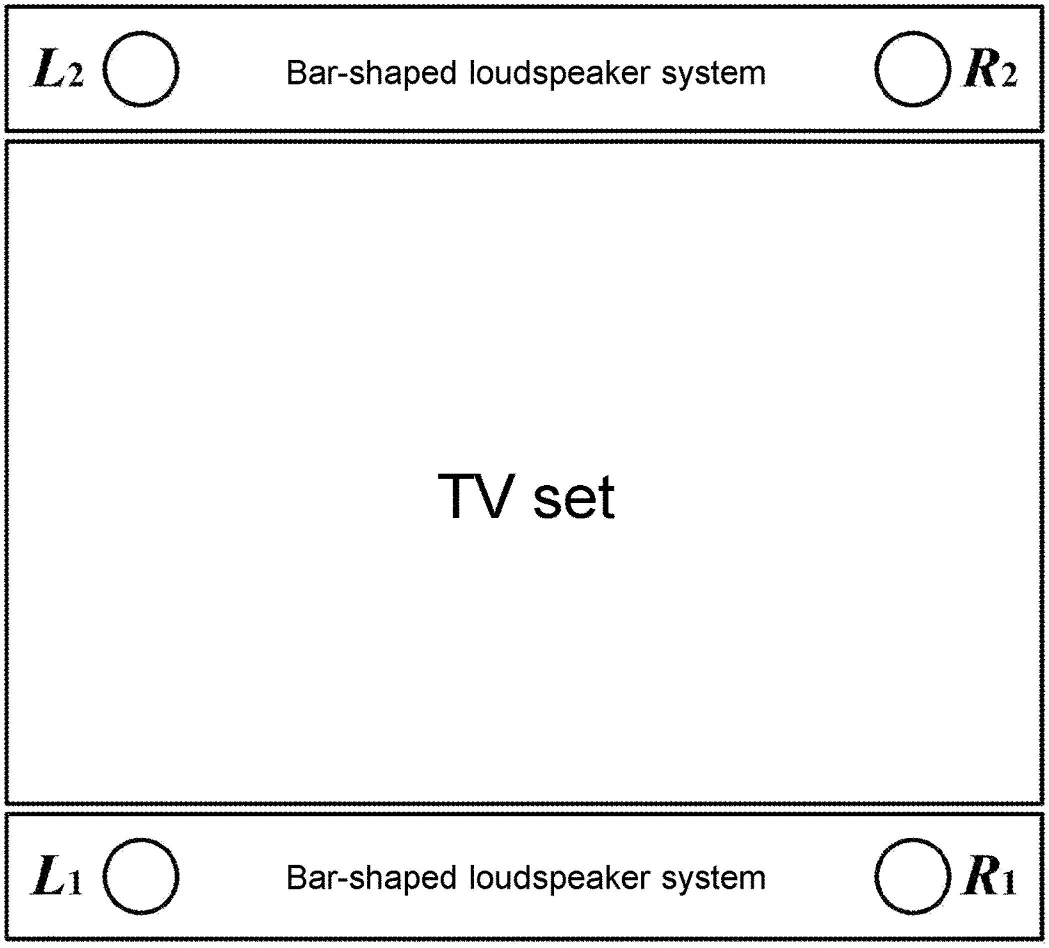
FIG. 1 is a schematic diagram of implementing the present invention by using a pair of bar-shaped loudspeakers systems arranged above and below a TV set respectively.
Figure 2:
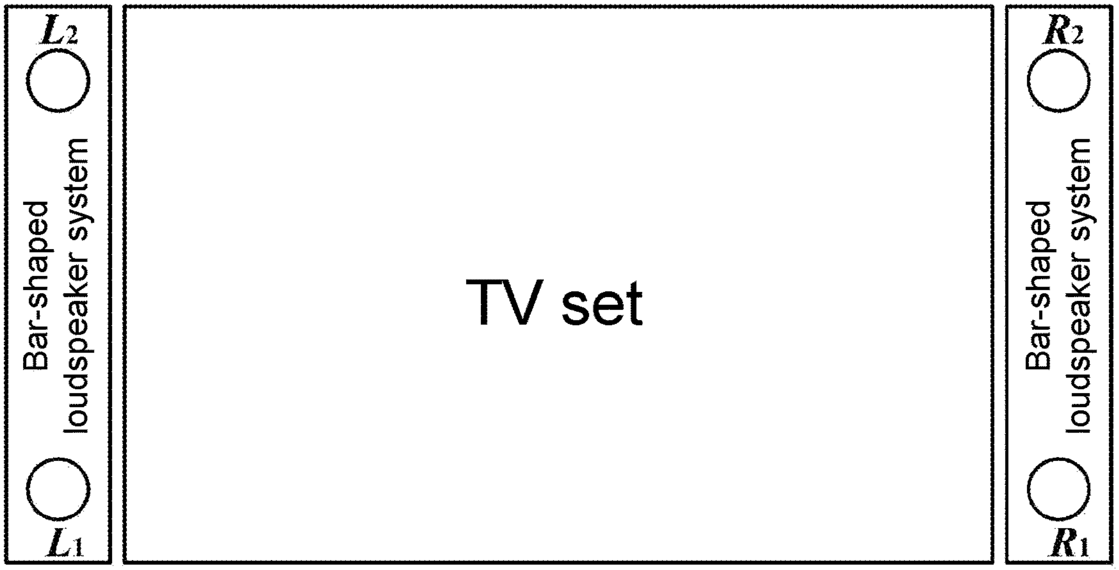
FIG. 2 is a schematic diagram of implementing the present invention by using a pair of bar-shaped loudspeaker systems vertically arranged on left and right sides of the TV set respectively.
Figure 3:
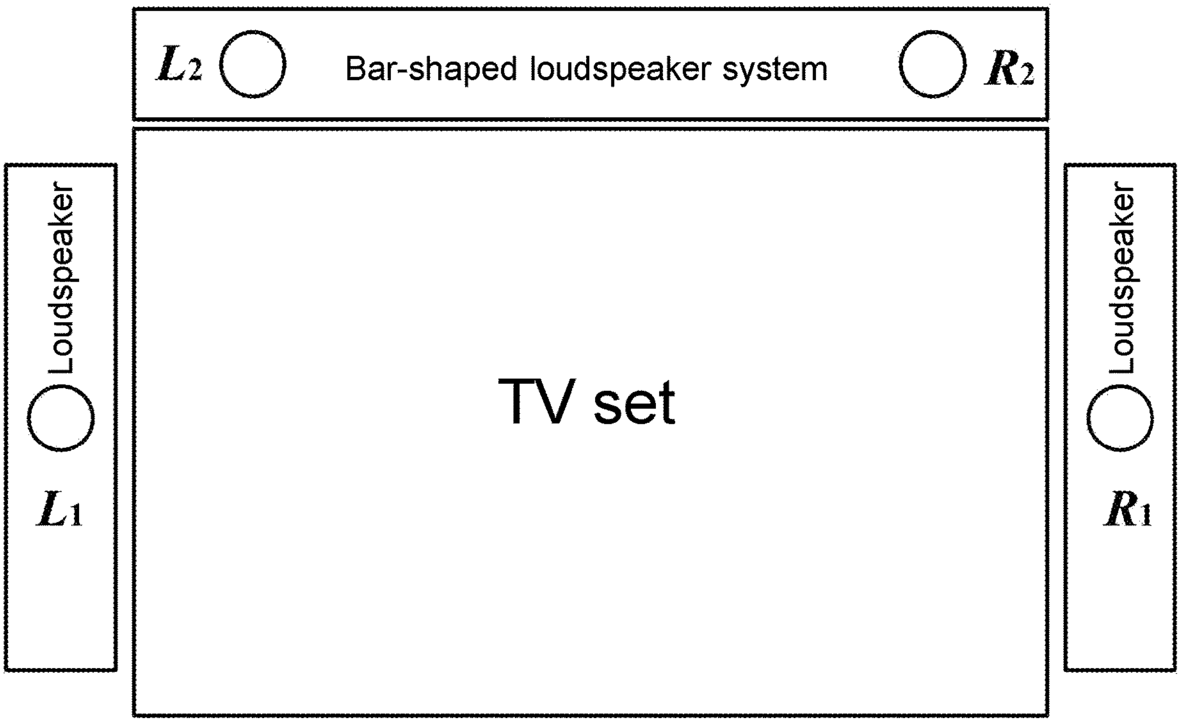
FIG. 3 is a schematic diagram of implementing the present invention by using a pair of loudspeakers arranged on the left and right sides of the TV set respectively and one bar-shaped loudspeaker system arranged above the TV set.
Figure 4:
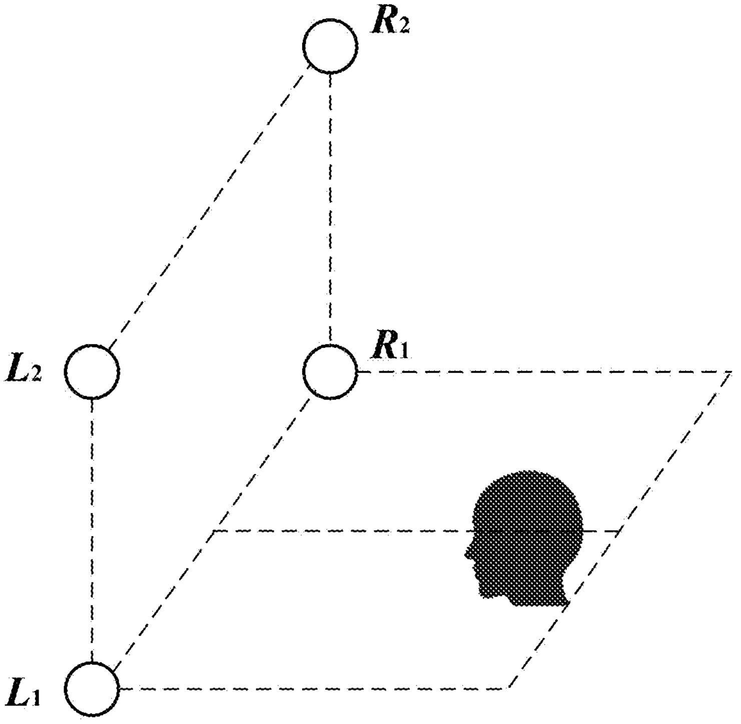
FIG. 4 is a schematic diagram of arrangement of left-front and right-front loudspeakers on a horizontal plane, and left-front-up and right-front-up loudspeakers on a high elevation plane.

FIG. 1, FIG. 2, and FIG. 3 show a pair of loudspeakers systems arranged around a TV set respectively. No matter how the present invention is implemented, an actual effect is an effect of four loudspeakers, namely left-front L1, right-front R1, left-front-up L2, and right-front-up R2 as shown in FIG. 4. The left-front and right-front loudspeakers are arranged on the horizontal plane (which may certainly be a slightly lower position), and an elevation is:

$$\varphi_{L1}=\varphi_{R1}=0° \quad (1)$$

For the practical uses in the TV set, a span azimuth between the left-front and right-front loudspeakers is smaller than the standard of 60°, which usually vary between 20° and 30°. Therefore, azimuths of the left-front and right-front loudspeakers are:

$$\theta_{L1}=10°\sim15°\ \theta_{R1}=-10°\sim-15°. \quad (2)$$

The left-front-up and right-front-up loudspeakers are arranged at a position above the horizontal plane, and elevations are:

$$\varphi_{L2}=\varphi_{R2}=30°\pm15°. \quad (3)$$

Moreover, azimuths of the left-front-up and right-front-up loudspeakers are:

$$\theta_{L2}=10°\sim15°\ \theta_{R2}=-10°\sim-15°. \quad (4)$$

Figure 5:
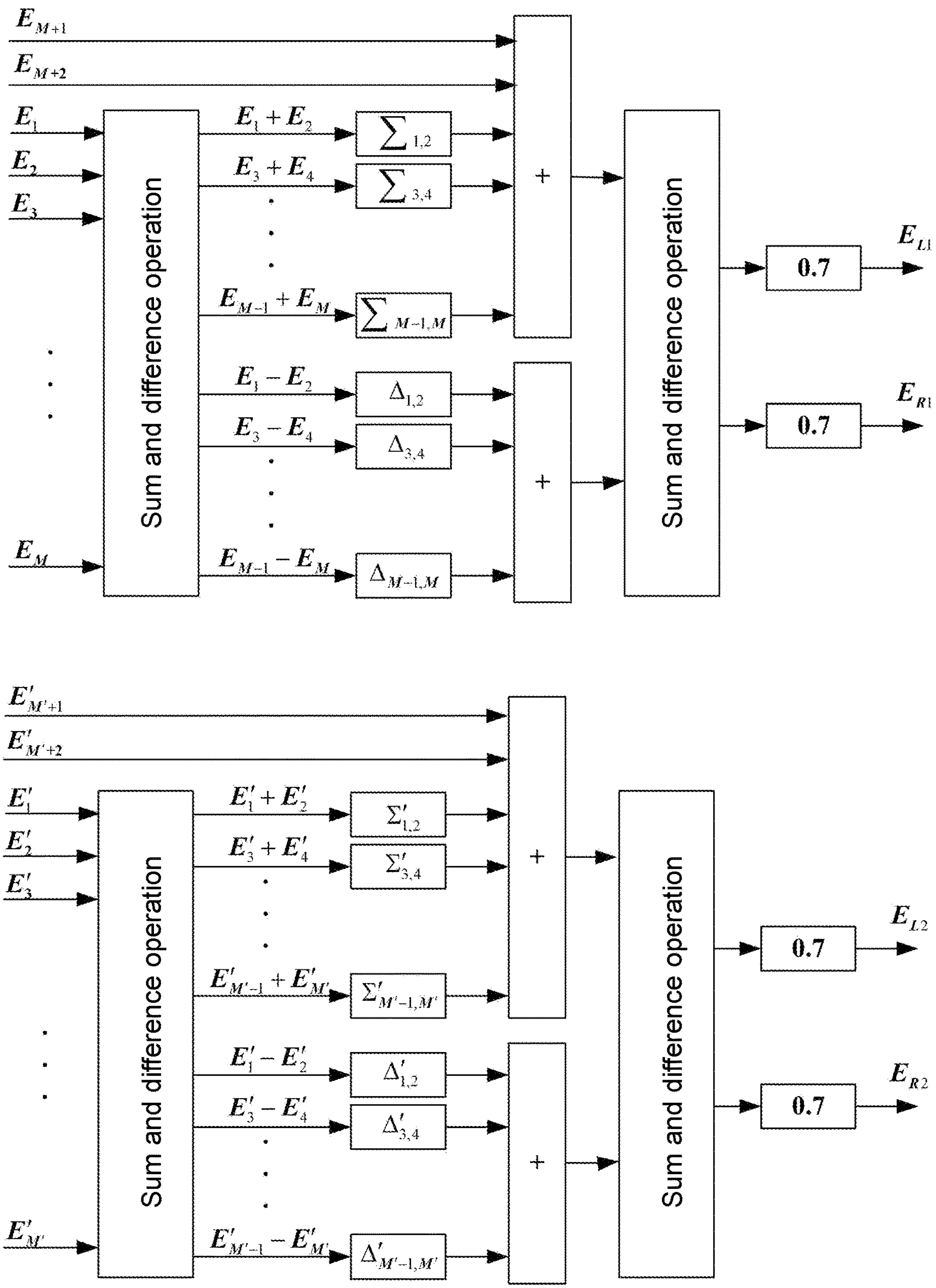
FIG. 5 is a block diagram of signal processing of the present invention.

There are various multichannel spatial surround sound formats, which generally includes channel signals and loudspeaker arrangement on two layers (a horizontal layer and an upper layer) as shown in FIG. 5. Suppose that there are M+2 loudspeakers in the horizontal layer, their channel signals are $E_1, E_2, \ldots E_{M+2}$, and elevations are $\phi_m=0°$, with m=1, 2, . . . (M+2). Azimuths of M non-front and non-back loudspeakers are $\theta_m$ respectively, with m=1, 2, . . . M, and azimuths of front and back loudspeakers (if they exist) are $\theta_{M+1}=0°$ and $\theta_{M+2}=180°$ respectively. Suppose that there are M'+2 loudspeakers in the upper layer, their channel signals are $E'_1, E'_2, \ldots E'_{M'+2}$, and elevations are $\phi'_{m'}=\phi_H$, with m'=1, 2 . . . (M'+2). Azimuths of M' non-front and non-back loudspeakers are $\theta'_{m'}$ respectively, with m'=1,2, . . . M', and azimuths of front and back loudspeakers (if they exist) are $\theta'_{M'+1}=0°$ and $\theta'_{M'+2}=180°$ respectively.

M non-front and non-back channel signals of the horizontal layer of the multichannel spatial surround sound are processed with virtual reproduction signal processing functions, and undergo a sum and difference operation to obtain a total sum signal $E_{SUM}=\Sigma_{1,2}\ (E_1+E_2)+\Sigma_{3,4}\ (E_3+E_4), \ldots +\Sigma_{M-1,M}\ (E_M+E_{M+1})+E_{M+1}+E_{M+2}$ of the horizontal layer and a total difference signal $E_{DIF}=\Delta_{1,2}\ (E_1-E_2)+\Delta_{3,4}$ $(E_3-E_4), \ldots +\Delta_{M-1,M}(E_{M-1}-E_M)$ of the horizontal layer, and then mixed with front or back signals (if they exist) of the horizontal layer which are attenuated by −3 dB (multiplied by a coefficient of 0.7), and then the signals are fed to the left-front and right-front actual loudspeakers. According to a condition that binaural sound pressures of virtual reproduction are equal to that of actual reproduction, and a power spectrum of reproduction signals is unchanged, signals reproduced by a pair of left-front and right-front actual loudspeakers are as follows:

$$E_{L1} = \sum_{m=1}^{M} A_1(\theta_m, f)E_m + 0.7E_{M+1} + 0.7E_{M+2} \tag{5}$$

$$E_{R1} = \sum_{m=1}^{M} B_1(\theta_m, f)E_m + 0.7E_{M+1} + 0.7E_{M+2}$$

wherein the virtual reproduction signal processing functions are given by the following equations:

$$A_1(\theta_m, f) = \frac{\alpha_1 H_L(\theta_m, f) - \beta_1 H_R(\theta_m, f)}{\sqrt{|\alpha_1 H_L(\theta_m, f) - \beta_1 H_R(\theta_m, f)|^2 + |-\beta_1 H_L(\theta_m, f) + \alpha_1 H_R(\theta_m, f)|^2}} \frac{|\alpha_1^2 - \beta_1^2|}{\alpha_1^2 - \beta_1^2} \tag{6}$$

$$B_1(\theta_m, f) = \frac{-\beta_1 H_L(\theta_m, f) + \alpha_1 H_R(\theta_m, f)}{\sqrt{|\alpha_1 H_L(\theta_m, f) - \beta_1 H_R(\theta_m, f)|^2 + |-\beta_1 H_L(\theta_m, f) + \alpha_1 H_R(\theta_m, f)|^2}} \frac{|\alpha_1^2 - \beta_1^2|}{\alpha_1^2 - \beta_1^2}$$

Where $H_L(\theta_m, f)$ and $H_R(\theta_m, f)$ are a pair of Head Related Transfer Functions (HRTFs) from virtual loudspeakers in a direction of $\theta_m$ in the horizontal plane to left and right ears, wherein f is a frequency; suppose that the left and right actual loudspeaker of the horizontal plane are left-right symmetric relative to a listener, and $\alpha_1=\alpha_1(f)$ and $\beta_1=\beta_1(f)$ are HRTFs (ipsilateral and contralateral HRTFs) from actual loudspeaker at left-front (or right-front) to the ipsilateral and contralateral ears, respectively.

M' non-front and non-back channel signals of the upper layer of the multichannel space surround sound are processed with virtual reproduction signal processing functions, and undergo an add and subtract operation to obtain a total sum signal $E'_{SUM}=\Sigma'_{1,2}(E'_1+E'_2)+\Sigma'_{3,4}(E'_3+E'_4) \ldots +\Sigma'_{M'-1,M'}(E'_{M'}+E'_{M'+1})+E'_{M'+1}+E'_{M'+2}$ of the upper layer and a total difference signal $E'_{DIF}=\Delta'_{1,2}(E'_1-E'_2)+\Delta_{3,4}(E'_3-E'_4) \ldots +\Delta'_{M'1,M}(E'_{M'}-E'_{M'+1})$ of the upper layer, and then mixed with front and back signals (if they exist) of the upper layer which are attenuated by −3 dB (multiplied by a coefficient of 0.7), and then the signals are fed to left-front-up and right-front-up actual loudspeakers. According to a condition that binaural sound pressures of virtual reproduction are equal to that of actual reproduction, and a power spectrum of reproduction signals is unchanged, signals reproduced by a pair of left-front-up and right-front-up actual loudspeakers are as follows:

$$E_{L2} = \sum_{m'=1}^{M'} A_2(\theta'_{m'}, f)E'_{m'} + 0.7E'_{M'+1} + 0.7E'_{M'+2} \tag{7}$$

-continued $$E_{R2} = \sum_{m'=1}^{M'} B_1(\theta'_{m'}, f)E_{m'} + 0.7E'_{M'+1} + 0.7E'_{M'+2}$$

wherein the virtual reproduction signal processing functions are given by the following equations:

$$A_2(\theta'_{m'}, f) = \frac{\alpha_2 H_L(\theta'_{m'}, f) - \beta_2 H_R(\theta'_{m'}, f)}{\sqrt{|\alpha_2 H_L(\theta'_{m'}, f) - \beta_2 H_R(\theta'_{m'}, f)|^2 + |-\beta_2 H_L(\theta'_{m'}, f) + \alpha_2 H_R(\theta'_{m'}, f)|^2}} \frac{|\alpha_2^2 - \beta_2^2|}{\alpha_2^2 - \beta_2^2} \tag{8}$$

$$B_2(\theta'_{m'}, f) = \frac{-\beta_1 H_L(\theta'_{m'}, f) + \alpha_2 H_R(\theta'_{m'}, f)}{\sqrt{|\alpha_2 H_L(\theta'_{m'}, f) - \beta_2 H_R(\theta'_{m'}, f)|^2 + |-\beta_2 H_L(\theta'_{m'}, f) + \alpha_2 H_R(\theta'_{m'}, f)|^2}} \frac{|\alpha_2^2 - \beta_2^2|}{\alpha_2^2 - \beta_2^2}$$

Where $H_L(\theta'_{m'}, f)$ and $H_R(\theta'_{m'}, f)$ are a pair of Head Related Transfer Functions (HRTFs) from virtual loudspeakers in a direction of $\theta'_{m'}$ in the horizontal plane to left and right ears; and $\alpha_2=\alpha_2(f)$ and $\beta_2=\beta_2(f)$ are HRTFs (ipsilateral and contralateral HRTFs) from actual loudspeaker at left-front-up (or right-front-up) to the ipsilateral and contralateral ears, respectively.

Generally, the loudspeakers arrangement in the multichannel spatial surround sound are left-right symmetric. Signal processing can be simplified by considering a symmetry. M non-front and non-back channel signals of the horizontal layer are numbered according to a rule that an odd number represents a left half-space channel and an even number represents a symmetric right half-space channel. Then the responses of virtual signal processing function in equation (6) satisfy following symmetric relationship:

$$\begin{aligned} -A_1(\theta_1, f) &= B_1(\theta_2, f) & A_1(\theta_2, f) &= B_1(\theta_1, f) \\ A_1(\theta_3, f) &= B_1(\theta_4, f) & A_1(\theta_4, f) &= B_1(\theta_3, f) \\ &\vdots \\ A_1(\theta_{M-1}, f) &= B_1(\theta_M, f) & A_1(\theta_M, f) &= B_1(\theta_{M-1}, f) \end{aligned} \tag{9}$$

Then, the signal processing of the equation (5) is equivalent to following equation (10):

$$\begin{bmatrix} E_{L1} \\ E_{R1} \end{bmatrix} = 0.7\begin{bmatrix} 1 & 1 \\ 1 & -1 \end{bmatrix}\left\{\sum_{m=odd}^{M-1}\begin{bmatrix} \Sigma_{m,m+1} & 0 \\ 0 & \Delta_{m,m+1} \end{bmatrix}\begin{bmatrix} 1 & 1 \\ 1 & -1 \end{bmatrix}\begin{bmatrix} E_m \\ E_{m+1} \end{bmatrix} + \begin{bmatrix} 1 \\ 0 \end{bmatrix}(E_{M+1} + E_{M+2})\right\} \tag{10}$$

The sum in equation (10) is over all odd numbers m, and $$\Sigma_{m,m+1}=0.707[A_1(\theta_m,f)+A_1(\theta_{m+1},f)]$$

$$\Delta_{m,m+1}=0.707[A_1(\theta_m,f)-A_1(\theta_{m+1},f)] \tag{11}$$

M' non-front and non-back channel signals of the upper layer are numbered according to a rule that an odd number represents a left half-space channel and an even number represents a symmetric right half-space channel. Then the responses of virtual signal processing function in equation (8) satisfy the following symmetric relationship:

$$A_2(\theta'_1, f) = B_2(\theta'_2, f) \qquad A_2(\theta'_2, f) = B_2(\theta'_1, f) \tag{12}$$
$$A_2(\theta'_3, f) = B_2(\theta'_4, f) \qquad A_2(\theta'_4, f) = B_2(\theta'_3, f)$$
$$\vdots$$
$$A_2(\theta'_{M'-1}, f) = B_2(\theta_{M'}, f) \quad A_2(\theta'_{M'}, f) = B_2(\theta_{M'-1}, f)$$

Then, the signal processing of the equation (7) is equivalent to following equation (13):

$$\begin{bmatrix} E_{L2} \\ E_{R2} \end{bmatrix} = 0.7\begin{bmatrix} 1 & 1 \\ 1 & -1 \end{bmatrix}\left\{\sum_{m'=odd}^{M'-1}\begin{bmatrix} \sum_{m',m'+1} & 0 \\ 0 & \Delta'_{m',m'+1} \end{bmatrix}\begin{bmatrix} 1 & 1 \\ 1 & -1 \end{bmatrix}\begin{bmatrix} E'_{m'} \\ E'_{m'+1} \end{bmatrix} + \begin{bmatrix} 1 \\ 0 \end{bmatrix}(E'_{M+1} + E'_{M+2})\right\} \tag{13}$$

The sum in equation (13) is over all odd numbers m', and $$\Sigma'_{m',m'+1}=0.707[A_1(\theta'_{m'},f)+A_1(\theta'_{m'+1},f)]$$

$$\Delta'_{m',m'+1}=0.707[A_1(\theta'_{m'},f)-A_1(\theta'_{m'+1},f)] \tag{14}$$

The virtual signal processing in equation (10) and equation (13) include (M+M') filters, which is just half of original 2(M+M') filters in equation (5) and equation (7). Therefore, the efficiency of virtual signal processing is improved. FIG. 5 is a block diagram of signal processing of the horizontal layer and that of the upper layer of the present invention obtained according to the equation (10) and equation (13). In practice, inverse Fourier transform may be used to transform frequency domain signal processing of the equation (10) and equation (13) into corresponding time domain signal processing.

Embodiment 1 Application in Blue-Ray Disc Player and Television

Multichannel spatial surround sound (digital) signals decoded and outputted by a blue-ray disc player or obtained from a digital transmission medium are virtually processed according to the method shown in FIG. 5 to obtain four-channel signals $E_{L1}$, $E_{R1}$, $E_{L2}$, and $E_{R2}$, then the signals are fed to a pair of bar-shaped loudspeaker systems arranged above and below the TV set (display) respectively, or a pair of bar-shaped loudspeaker systems vertically arranged on left and right sides of the TV set respectively, or a pair of loudspeakers arranged on the left and right sides of the TV set respectively and one bar-shaped loudspeaker system arranged above the TV set, and reproduced with a space surround sound effect. The virtual signal processing may be used as a part of hardware circuit in the blue-ray disc player, or a part of hardware circuit of the TV set, or a hardware circuit inside an active loudspeaker system.

Embodiment 2 Application in Home Theater

Multichannel spatial surround sound (digital) signals decoded and outputted by a blue-ray disc player or obtained from a digital transmission medium are fed to an amplifier of the home theater. The virtual signal processing in FIG. 5 is a part of functional circuit in the amplifier. Four-channel signals $E_{L1}$, $E_{R1}$, $E_{L2}$, and $E_{R2}$ are obtained and respectively fed to four external full audible bandwidth loudspeakers for reproduction.

Embodiment 3 Application in Multimedia Computer

Multichannel spatial surround sound (digital) signals are read by a blue-ray drive of the computer, or obtained by passing through a digital transmission medium and decoded, and then the virtual signal processing shown in FIG. 5 is implemented by computer software (which may also be implemented by a special hardware circuit on a sound card of the computer), and four-channel signals $E_{L1}$, $E_{R1}$, $E_{L2}$, and $E_{R2}$ are obtained and fed to four external or computer-contained full-band loudspeakers for reproduction.

The present invention specifically introduces an application of virtual reproduction of 9.1-channel spatial surround sound in the TV set as an embodiment, and the present invention is implemented by a hardware circuit made of a general signal processing chip (DSP). However, the present invention is not limited to the virtual reproduction of the 9.1 channel spatial surround sound, but also includes virtual reproduction of other multichannel spatial surround sounds, such as virtual reproduction of 11.1-channel spatial surround sound and virtual reproduction of 13.1 channel spatial surround sound. The present invention is not limited to the application in the TV set, but also includes other applications, such as the application in the blue-ray disc player, the application in the home theater, the application in the multimedia computer, and the like. The present invention is not limited to being implemented by the general DSP, but may also be implemented in other ways, such as implemented by being designed as a special integrated circuit chip, or being designed as software to be implemented on the multimedia computer.

Figure 6A:
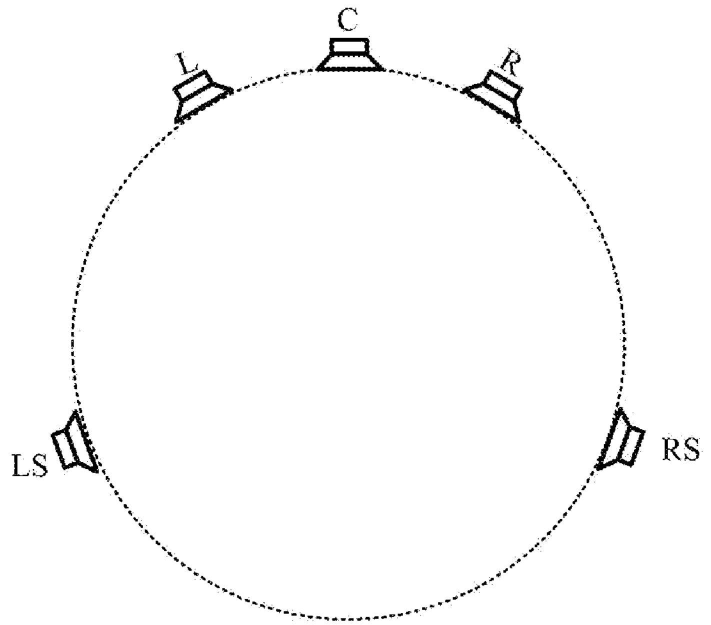
FIG. 6*a* is a schematic diagram of arrangement of 9.1-channel spatial surround sound loudspeakers on a horizontal layer.
Figure 6B:
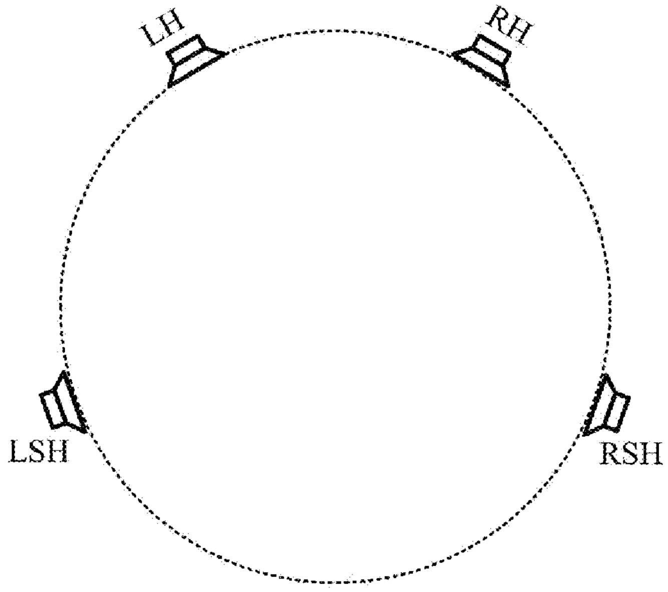
FIG. 6*b* is a schematic diagram of arrangement of the 9.1-channel spatial surround sound loudspeakers on an upper layer.

The 9.1-channel surround sound is the simplest spatial surround sound system. The 9.1-channel spatial surround sound includes arrangement of two layers of loudspeakers and nine independent full audible bandwidth channel signals in total. Arrangement directions thereof are shown in FIG. 6*a* and FIG. 6*b*. The horizontal layer is provided with L, C, R, LS, and RS loudspeakers, the upper layer is provided with LH, RH, LSH, and RSH loudspeakers, and an optional subwoofer channel (loudspeaker) is added. The horizontal layer includes M=4 left-right symmetric non-front and non-back channel signals, namely left $E_L$, right $E_R$, left surround $E_{LS}$, and right surround $E_{RS}$, and a front central channel $E_C$ is added. Numbering is carried out according to a rule that an odd number represents a left half-space channel and an even number represents a symmetric right half-space channel, and a number of each signal is:

$$E_1=E_L E_2=E_R E_3=E_{LS} E_4=E_{RS} E_5=E_C \tag{15}$$

Corresponding elevation of each loudspeakers of the horizontal layer is 0°, and azimuths are respectively:

$$\theta_1=\theta_L=30° \ \theta_2=\theta_R=-30° \ \theta_3=\theta_{LS}=110° \ \theta_4=\theta_{RS}=-110° \ \theta_5=\theta_C=0° \tag{16}$$

The upper layer of the 9.1-channel spatial surround sound includes M'=4 left-right symmetric non-front and non-back channel signals in total, namely, left-up $E'_{LH}$, right-up $E'_{RH}$, left-up-surround $E'_{LSH}$, and right-up-surround $E'_{RSH}$, without front or back channel signals. Numbering is carried out according to a rule that an odd number represents a left half-space channel and an even number represents a symmetric right half-space channel, and a number of each signal is:

$$E'_1=E'_{LH} E'_2=E'_{RH} E'_3=E'_{LSH} E'_4=E'_{RSH} \tag{17}$$

Corresponding elevation of each loudspeakers of the upper layer is 30°, and azimuths are respectively:

$$\theta'_1=\theta'_{LH}=30° \ \theta'_2=\theta'_{RH}=-30° \ \theta'_3=\theta'_{LSH}=110° \ \theta'_4=\theta'_{RSH}=-110° \tag{18}$$

The virtual signal processing can be implemented by the method of the above equations (10) and (13) with loudspeakers arrangement parameters of the 9.1-channel surround sound. Since the actual loudspeakers of the front-half space cannot generate virtual sound sources (virtual loudspeakers) of the back-half space, the virtual surround loudspeakers of the horizontal layer and the upper layer are moved forward to two sides in signal processing parameters, and azimuths of the loudspeakers are taken as $$\theta_3=\theta_{LS}=90^\circ\ \theta_4=\theta_{RS}=-90^\circ\ \theta'_3=\theta'_{LS}=90^\circ\ \theta'_4=\theta'_{RS}=-90^\circ \quad (19)$$

A subwoofer channel signals is processed in the same way as the central channel signal of the horizontal plane.

The 9.1-channel spatial surround sound (digital) signals decoded and outputted by a blue-ray disc player or obtained from a digital transmission medium are virtually processed to obtain four-channel signals $E_{L1}$, $E_{R1}$, $E_{L2}$, and $E_{R2}$, then the signals are reproduced by a pair of actual bar-shaped loudspeaker systems arranged above and below the TV set respectively. The virtual signal processing is implemented by a hardware circuit made of a general signal processing chip (ADAU1701), which is used as a part of the hardware circuit in the (active) actual bar-shaped loudspeaker system. HRTF data of a KEMAR artificial head obtained by experimental measurement is used for the signal processing, and a sampling frequency is 44.1 kHz. A finite impulse response (FIR) filter is used to implement the virtual signal processing, and a length of the filter is 128 points.

Specific implementation steps are as follows.

In step 1, two bar-shaped loudspeaker systems are respectively arranged above and below the TV set, the elevations of the loudspeakers are 0° and 30° respectively, and the azimuths of the loudspeakers are ±15°;

In step 2, five channel signals of the horizontal layer of the original 9.1-channel spatial surround sound are inputted, including left $E_L$, right $E_R$, left surround $E_{LS}$, right surround $E_{RS}$, and front central channel $E_C$;

In step 3, four channel signals of the upper layer of the original 9.1-channel spatial surround sound are inputted, including left-up $E'_{LH}$, right-up $E'_{RH}$, left-up-surround $E'_{LSH}$, and right-up-surround $E'_{RSH}$;

In step 4, an add and subtract (sum and difference) operation is carried out on every left half-space channel signal of the horizontal layer and a symmetric right half-space channel signal to obtain two sum signals $(E_L+E_R)$ and $(E_{LS}+E_{RS})$ of the horizontal layer and two difference signals $(E_L-E_R)$ and $(E_{LS}-E_{RS})$ of the horizontal layer;

In step 5, the add and subtract (sum and difference) operation is carried out on each left half-space channel signal of the upper layer and a symmetric right half-space channel signal to obtain two sum signals $(E'_{LH}+E'_{RH})$ and $(E'_{LSH}+E'_{RSH})$ of the upper layer and two difference signals $(E'_{LH}-E'_{RH})$ and $(E'_{LSH}-E'_{RSH})$ of the upper layer;

In step 6, two sum signals of the horizontal layer are filtered with two virtual reproduction signal processing functions $\Sigma_{1,2}$ and $\Sigma_{3,4}$, and then summed, and the central channel signal is added to obtain a total sum signal $E_{SUM}=\Sigma_{1,2}\ (E_L+E_R)+\Sigma_{34}(E_{LS}+E_{RS})+E_C$ of the horizontal layer.

In step 7, two difference signals of the horizontal layer are filtered with two virtual reproduction signal processing functions $\Delta_{1,2}$ and $\Delta_{3,4}$, and then summed to obtain a total difference signal $E_{DIF}=\Delta_{1,2}\ (E_L-E_R)+\Delta_{3,4}\ (E_{LS}-E_{RS})$ of the horizontal layer.

In step 8, two sum signals of the upper layer are filtered with two virtual reproduction signal processing functions $E'_{1,2}$ and $E'_{3,4}$, and then summed to obtain a total sum signal $E'_{SUM}=\Sigma'_{1,2}\ (E'_{LH}+E'_{RH})+\Sigma'_{3,4}\ (E'_{LSH}+E'_{RSH})$.

In step 9, two difference signals of the upper layer are filtered with two virtual reproduction signal processing functions $\Delta'_{1,2}$ and $\Delta'_{3,4}$, and then summed to obtain a total difference signal $E'_{DIF}=\Delta'_{1,2}\ (E'_{LH}-E'_{RH})+\Delta'_{3,4}(E'_{LSH}-E'_{RSH})$ of the upper layer.

In step 10, the add and subtract (sum and difference) operation is carried out on the total sum signal $E_{SUM}$ and the total difference signal $E_{DIF}$ of the horizontal layer, and the signals are attenuated by −3 dB (multiply by 0.7) to obtain the reproduction signals $E_{L1}=0.7\ (E_{SUM}+E_{DIF})$ and $E_{R1}=0.7\ (E_{SUM}-E_{DIF})$ of the left-front and right-front actual loudspeakers of the horizontal plane, and the signals are fed back to the corresponding actual loudspeakers for reproduction.

In step 11, the add and subtract (sum and difference) operation is carried out on the total sum signal $E'_{SUM}$ and the total difference signal $E'_{DIF}$ of the upper layer, and the signals are attenuated by −3 dB (multiplied by 0.7) to obtain the reproduction signals $E_{L2}=0.7\ (E'_{SUM}+E'_{DIF})$ and $E_{R2}=0.7\ (E'_{SUM}-E'_{DIF})$ of the left-front-up and right-front-up actual loudspeakers, and the signals are fed back to the corresponding actual loudspeakers for reproduction.

As described above, the present invention can be well implemented.

Since arrangement of five channels and loudspeakers of the horizontal layer of the 9.1-channel spatial surround sound is consistent with that of the traditional 5.1 channel horizontal surround sound, the signal processing of the present invention is completely compatible with that of existing virtual reproduction of 5.1 channel surround sound double loudspeakers (granted national invention patent, ZL02134416.7).

A subjective evaluation experiment verifies an actual effect of the present invention. A key to evaluate the virtual reproduction of the multichannel spatial surround sound is the effect of the virtual loudspeakers, which is to evaluate a perception direction of each virtual loudspeaker. In the embodiment of the virtual reproduction of the 9.1-channel spatial surround sound of the present invention, the five virtual loudspeakers of the horizontal layer and the signal processing are exactly the same as those of existing virtual reproduction of 5.1-channel surround sound double loudspeakers, and the effects should also be the same. Therefore, the subjective evaluation experiment focuses on verifying a positioning effect of the four virtual loudspeakers of the upper layer.

The experiment is carried out in a listening room with reverberation time of 0.15 s. The elevations and the azimuths of the four actual loudspeakers are $\phi_{L1}=\phi_{R1}=0^\circ$ and $\phi_{L2}=\theta_{R2}=30^\circ$ as well as $\theta_{L1}=\theta_{L2}=15^\circ$ and $\theta_{R1}=\theta_{R2}=-15^\circ$, and a distance from a head center of a listener is 1.5 m. Original experimental signals include a speech signal (standard Chinese of male voice) and a music signal (orchestral music: John Strauss, a segment of Blue Danube). After the signal processing, signals corresponding to directions of the four virtual loudspeakers of the upper layer of the 9.1-channel spatial surround sound are generated respectively, and the actual loudspeakers are used.

In the experiment, the listener judges the directions of the perceived virtual loudspeakers, and repeatedly judges for three times under each reproduction condition. A total of eight subjects participate in the experiment, so that there are 24 judgments under each reproduction condition. Finally, 24 judgments under each reproduction condition are statistically analyzed. Statistical parameters for measuring a localization effect include: front-back confusion rate, up-down confusion rate, average unsigned azimuth error and standard deviation, and average unsigned elevation error and standard deviation of a virtual source. Results are shown in Table 1.

TABLE 1

| Statistics of localization experiment results | | | | | |
|---|---|---|---|---|---|
| Virtual loudspeakers | | LH | RH | LSH | RSH |
| Target azimuth/° | | 30 | −30 | 90 | −90 |
| Target elevation/° | | 30 | 30 | 30 | 30 |
| Front-back confusion rate/% | Speech | 0 | 0 | 0 | 0 |
| | Music | 0 | 0 | 0 | 0 |
| Up-down confusion rate/% | Speech | 0 | 0 | 0 | 0 |
| | Music | 0 | 0 | 0 | 0 |
| Average unsigned azimuth | Speech | 6.3 ± 3.1 | 4.2 ± 3.8 | 26.7 ± 7.5 | 27.2 ± 9.4 |
| error and standard deviation/° | Music | 4.8 ± 2.7 | 4.4 ± 3.6 | 30.3 ± 9.1 | 33.5 ± 13.8 |
| Average unsigned elevation | Speech | 2.4 ± 2.0 | 2.1 ± 1.3 | 3.4 ± 1.9 | 2.6 ± 1.4 |
| error and standard deviation/° | Music | 2.1 ± 1.5 | 2.9 ± 1.3 | 2.9 ± 1.6 | 3.3 ± 2.1 |

It can be seen from Table 1 that no front-back as well as up-down confusion in perceiving virtual sources occurs in reproduction. The average unsigned elevation error is not large, so that localization perception in a vertical direction can be generated. The average unsigned azimuth error of a lateral target azimuth $\theta=\pm 90°$ is large, and an azimuth of an actual perceived virtual source is about 60°, which is an inherent defect of virtual processing. Therefore, the virtual source localization experiment verifies the present invention.

What is claimed is:

1. A virtual reproduction method for a multichannel spatial surround sound in a three-dimensional space, the method comprising: the following steps:

step 1: arranging four loudspeakers at directions of left-front, right-front in a horizontal plane and at directions of left-front-up, right-front-up on an elevation plane with an elevation angle of 30°±15° respectively, wherein the elevation angle is measured from a listening position on the horizontal plane;

step 2: inputting M non-front and non-back channel signals $E_1$, $E_2$, . . . $E_M$ of an original spatial surround sound in a horizontal layer, and a front channel signal $E_{M+1}$ and a back channel signal $E_{M+2}$ if the front channel signal $E_{M+1}$ and a back channel signal $E_{M+2}$ exist, wherein M is an even number; and numbering M channel signals according to a rule that an odd number represents a left half-space channel and an even number represents a symmetric right half-space channel;

step 3: inputting M' non-front and non-back channel signals $E'_1$, $E'_2$, . . . $E'_{M'}$ of the original spatial surround sound in an upper layer, and a front channel signal $E'_{M'+1}$ and a back channel signal $E'_{M'+2}$ if the front channel signal $E'_{M'+1}$ and the back channel signal $E'_{M'+2}$ exist wherein M' is an even number; and numbering M' channel signals according to a rule that an odd number represents a left half-space channel and an even number represents a symmetric right half-space channel;

step 4: for the M channel signals of the horizontal layer, carrying out a sum and difference operation on each left half-space channel signal and each symmetric right half-space channel signal to obtain M/2 sum signals $(E_1+E_2)$, $(E_3+E_4)$, . . . $(E_{M-1}+E_M)$ of the horizontal layer and M/2 difference signals $(E_1-E_2)$, $(E_3-E_4)$, . . . $(E_{M-1}-E_M)$ of the horizontal layer;

step 5: for the M' channel signals of the upper layer, carrying out a sum and difference operation on each left half-space channel signal and each symmetric right half-space channel signal to obtain M'/2 sum signals $(E'_1+E'_2)$, $(E'_3+E'_4)$, . . . $(E'_{M'-1}+E'_{M'+1})$ of the upper layer and M'/2 difference signals $(E'_1-E'_2)$, $(E'_3-E'_4)$, . . . $(E'_{M'-1}-E'_{M'})$ of the upper layer;

step 6: filtering the M/2 sum signals of the horizontal layer with M/2 virtual reproduction signal processing functions $\Sigma_{1,2}$, $\Sigma_{3,4}$, . . . $\Sigma_{M-1,M}$ respectively and summing the signals, and then adding the front and back channel signals $\Sigma_{M+1}$ and $E_{M+2}$, if the front and back channel signals $E_{M+1}$ and $E_{M+2}$ exist, to obtain a total sum signal $E_{SUM}=\Sigma_{1,2}(E_1+E_2)+\Sigma_{3,4}(E_3+E_4), \ldots +\Sigma_{M-1,M}(E_M+E_{M+1})+E_{M+1}+E_{M+2}$ of the horizontal layer;

step 7: filtering the M/2 difference signals of the horizontal layer with M/2 virtual reproduction signal processing functions $\Delta_{1,2}$, $\Delta_{3,4}$ . . . $\Delta_{M-1,M}$ respectively and then summing the signals to obtain a total difference signal $E_{DIF}=\Delta_{1,2}(E_1-E_2)+\Delta_{3,4}(E_3-E_4), \ldots \Delta_{M-1,M}(E_{M-1}-E_M)$ of the horizontal layer;

step 8: filtering the M'/2 sum signals of the upper layer with M'/2 virtual reproduction signal processing functions $\Sigma'_{1,2}$, $\Sigma'_{3,4}$, . . . $\Sigma'_{M'-1,M'}$ respectively and summing the signals, and then adding the possible front and back channel signals $E_{M'+1}$ and $E_{M'+2}$ to obtain a total sum signal $E'_{SUM}=\Sigma'_{1,2}(E'_1+E'_2)+\Sigma'_{3,4}(E'_3+E'_4), \ldots +\Sigma'_{M'-1,M'}(E'_{M'}+E'_{M'+1})+E'_{M'+1}+E'_{M'+2}$ of the upper layer;

step 9: filtering the M'/2 difference signals of the upper layer with M'/2 virtual reproduction signal processing functions $\Delta'_{1,2}$, $\Delta'_{3,4}$, . . . $\Delta'_{M-1,M}$ respectively and then summing the signals to obtain a total difference signal $E'_{DIF}=\Delta'_{1,2}(E'_1-E'_2)+\Delta'_{3,4}(E'_3-E'_4), \ldots +\Delta'_{M'-1,M'}(E'_{M'}-E'_{M'+1})$ of the upper layer;

step 10: carrying out a sum and difference operation on the total sum signal $E_{SUM}$ and the total difference signal $E_{DIF}$ of the horizontal layer, attenuating them to respectively obtain reproduced signals for actual loudspeakers at left-front and right-front directions in the horizontal plane, and feeding the signals to corresponding actual loudspeakers for reproduction; and step 11: carrying out a sum and difference operation on the total sum signal $E'_{SUM}$ and the total difference signal $E'_{DIF}$ of the upper layer, attenuating them to respectively obtain reproduction signals of actual loudspeakers at left-front-up and right-front-up directions, and feeding the signals to corresponding actual loudspeakers for reproduction.

2. The virtual reproduction method for the multichannel spatial surround sound in three-dimensional space according to claim 1, wherein in the step 10, the sum and difference operation is carried out on the total sum signal $E_{SUM}$ and the total difference signal $E_{DIF}$ of the horizontal layer, and the signals are attenuated by −3 dB, which is, multiplied by 0.7 to respectively obtain the reproduction signals $E_{L1}=0.7(E_{SUM}+E_{DIF})$ and $E_{R1}=0.7(E_{SUM}-E_{DIF})$ of the actual loudspeakers at left-front and right-front directions respectively in the horizontal plane, and the signals are fed to the corresponding actual loudspeakers for reproduction.

3. The virtual reproduction method for the multichannel spatial surround sound in three-dimensional space according to claim 1, wherein in the step 11, the sum and difference operation is carried out on the total sum signal $E'_{SUM}$ and the total difference signal $E'_{DIF}$ of the upper layer, and the signals are attenuated by −3 dB, which is, multiplied by 0.7 to respectively obtain the reproduction signals $E_{L2}=0.7(E'_{SUM}+E'_{DIF})$ and $E_{R2}=0.7(E'_{SUM}-E'_{DIF})$ of the actual loudspeakers at left-front-up and right-front-up directions respectively, and the signals are fed to the corresponding actual loudspeakers for reproduction.

4. The virtual reproduction method for the multichannel spatial surround sound in three-dimensional space according to claim 1, wherein the filtering with the M/2 virtual reproduction signal processing functions $\Sigma_{1,2}$, $\Sigma_{3,4}$, . . . $\Sigma_{M-1,M}$ in the step 6, and the filtering with the M/2 virtual reproduction signal processing functions $\Delta_{1,2}$, $\Delta_{3,4}$ . . . $\Delta_{M-1,M}$ in step 7 are carried out according to the virtual reproduction signal processing functions obtained by the following equations:

$$\sum_{m,m+1} = 0.707[A_1(\theta_m,\omega) + A_1(\theta_{m+1},\omega)]$$

$$\Delta_{m,m+1} = 0.707[A_1(\theta_m,\omega) - A_1(\theta_{m+1},\omega)]$$

$$A_1(\theta_m, f) = \frac{(\alpha_1 H_L(\theta_m, f) - \beta_1 H_R(\theta_m, f))}{\sqrt{\begin{array}{l}|\alpha_1 H_L(\theta_m, f) - \beta_1 H_R(\theta_m, f)|^2 + \\ |-\beta_1 H_L(\theta_m, f) + \alpha_1 H_R(\theta_m, f)|^2\end{array}}} \frac{|\alpha_1^2 - \beta_1^2|}{\alpha_1^2 - \beta_1^2}$$

wherein m=1, 2, . . . M, wherein $H_L(\theta_m, f)$ and $H_R(\theta_m, f)$ are a pair of Head Related Transfer Functions (HRTFs) from virtual loudspeakers in a direction of azimuth $\theta_m$ of the horizontal plane to left and right ears, wherein f is a frequency; and $\alpha_1=\alpha_1(f)$ and $\beta_1=\beta_1(f)$ are HRTFs from actual loudspeaker at horizontal left-front or right-front to the ipsilateral and contralateral ears, respectively.

5. The virtual reproduction method for the multichannel spatial surround sound in three-dimensional space according to claim 1, wherein the filtering with the M'/2 virtual reproduction signal processing functions $\Sigma'_{1,2}$, $\Sigma'_{3,4}$, . . . $\Sigma'_{M'-1,M'}$ in the step 8, and the filtering with the M'/2 virtual reproduction signal processing functions $\Delta'_{1,2}$, $\Delta'_{3,4}$, . . . $\Delta'_{M'-1,M'}$ in the step 9 are carried out according to virtual reproduction signal processing functions obtained by the following equations:

$$\sum'_{m',m'+1} = 0.707[A_2(\theta'_{m'}, f) + A_2(\theta'_{m'+1}, f)]$$

$$\Delta'_{m',m'+1} = 0.707[A_2(\theta'_{m'}, f) - A_1(\theta'_{m'+1}, f)]$$

$$A_2(\theta'_{m'}, f) = \frac{\alpha_2 H_L(\theta'_{m'}, f) - \beta_2 H_R(\theta'_{m'}, f)}{\sqrt{\begin{array}{l}|\alpha_2 H_L(\theta'_{m'}, f) - \beta_2 H_R(\theta'_{m'}, f)|^2 + \\ |-\beta_2 H_L(\theta'_{m'}, f) + \alpha_2 H_R(\theta'_{m'}, f)|^2\end{array}}} \frac{|\alpha_2^2 - \beta_2^2|}{\alpha_2^2 - \beta_2^2}$$

wherein m=1, 2, . . . M', wherein $H_L(\theta'_{m'}, f)$ and $H_R(\theta'_{m'}, f)$ are a pair of Head Related Transfer Functions (HRTFs) from virtual loudspeakers in a direction of $\theta'_{m'}$ of the horizontal plane to left and right ears, wherein f is a frequency; and $\alpha_2=\alpha_2(f)$ and $\beta_2=\beta_2(f)$ are HRTFs from actual loudspeaker at left-front-up or right-front-up direction in the ipsilateral and contralateral ears, respectively.

* * * * *